(12) United States Patent
Bartel et al.

(10) Patent No.: US 12,617,712 B2
(45) Date of Patent: May 5, 2026

(54) FUSED LAYER AND CORE

(71) Applicant: Tundra Composites, LLC, White Bear Lake, MN (US)

(72) Inventors: Adam Bartel, St. Paul, MN (US); Scott Bohnen, Stillwater, MN (US); Kurt Heikkila, Marine on the St. Croix, MN (US)

(73) Assignee: Tundra Compoistes, LLC, White Bear Lake, MN (US)

( * ) Notice: Subject to any disclaimer, the term of this patent is extended or adjusted under 35 U.S.C. 154(b) by 644 days.

(21) Appl. No.: 17/862,944

(22) Filed: Jul. 12, 2022

(65) Prior Publication Data

US 2023/0113081 A1 Apr. 13, 2023

Related U.S. Application Data

(60) Provisional application No. 63/254,416, filed on Oct. 11, 2021.

(51) Int. Cl.
*C03C 17/02* (2006.01)
*C03C 23/00* (2006.01)

(52) U.S. Cl.
CPC ............ *C03C 17/02* (2013.01); *C03C 23/007* (2013.01); *C03C 2217/229* (2013.01); *C03C 2218/32* (2013.01)

(58) Field of Classification Search
None
See application file for complete search history.

(56) References Cited

U.S. PATENT DOCUMENTS

| | | | |
|---|---|---|---|
| 6,645,624 B2 | 11/2003 | Adefris et al. | |
| 6,797,023 B2 | 9/2004 | Knapp et al. | |
| 7,300,479 B2 | 11/2007 | McArdle et al. | |
| 8,506,364 B2 | 8/2013 | Beyer et al. | |
| 9,102,858 B2 | 8/2015 | Gebhardt | |
| 9,321,149 B2 | 4/2016 | Van et al. | |
| 10,155,892 B2 | 12/2018 | Monroe et al. | |
| 10,259,102 B2 | 4/2019 | Goers et al. | |
| 10,696,883 B2 | 6/2020 | Rosenflanz et al. | |
| 2002/0095871 A1 | 7/2002 | McArdle et al. | |
| 2008/0253833 A1* | 10/2008 | Gelfant | E01F 9/524 523/172 |
| 2020/0132896 A1* | 4/2020 | Heikkila | G02B 5/13 |

FOREIGN PATENT DOCUMENTS

| | | |
|---|---|---|
| CA | 3116190 A1 | 4/2020 |
| EP | 2861545 A1 | 4/2015 |
| EP | 4027178 A1 | 7/2022 |
| WO | 9407809 | 4/1994 |
| WO | 2020087090 A1 | 4/2020 |

* cited by examiner

*Primary Examiner* — Ronak C Patel

(74) *Attorney, Agent, or Firm* — Mark DiPietro; Fred Morgan

(57) ABSTRACT

A robust coated core comprising a composite with a fused or sintered coating.

11 Claims, 1 Drawing Sheet

FUSED LAYER AND CORE

CROSS REFERENCE TO RELATED APPLICATIONS

This application claims the benefit of U.S. Provisional Patent Application No. 63/254,416, filed Oct. 11, 2021. This application is hereby incorporated by reference in its entirety.

FIELD

The embodiments of this application relate generally to composites that have a fused interphase layer on a core bead. The claims relate to an interphase layer that is useful in forming a functional composite. The composite comprises a core bead with an interphase coating that can act to bond a functional material to the core bead. The functional material can provide a catalytic, chemical, or physical property or mode of action not obtained by the core bead or the interphase coating.

BACKGROUND

Conventional functional particles have a known useful lifetime. The functional lifetime is limited by contamination of the functional particle from the use environment. Further, the lifetime is limited by the loss of functional material from the surface of the article during use. Lastly, the functional lifetime is limited by the decomposition or poisoning of the functional particulates. There is a substantial need to develop an easily manufactured composite comprising functional particulate. A need is seen to reduce a manufacturing cost and improve manufacturing methods of the functional particle carried on a substrate. A substantial need exists for a functional particle article or element using the functional particle substrate. To remedy the problems arising from the use of conventional material/particle coatings an improved functional composite has been developed.

BRIEF DESCRIPTION

Briefly as disclosed herein, we have found a core with a fused layer bonded to the core. We have found that use of a coating composition comprising a blend of an interfacial modifier (IM), and a glass particulate provides a robust layer for later uses.

Sintering a finely divided glass particulate and the interfacial modifier results in the rapid and uniform formation of one or more layers of a fused material surrounding the core bead. The fused nature of the composite provides a durable robust composite that can survive a harsh use environment. We have seen that the entire outer surface of the core bead, or virtually the entire surface of the core bead, can be covered with the interphase layer.

Disclosed herein is a composite structure comprising, consisting essentially of or consisting of:
- (i) a substantially spherical soda lime glass core bead with an outer surface and a diameter of from about 500 to about 2000 micrometers; and
- (ii) at least one continuous fused interphase layer covering the outer surface of the core bead,
- wherein the at least one continuous fused interphase layer consists of fused soda lime glass particulates and an inorganic metal or metalloid central atom derived from an interfacial modifier. The inorganic atom chosen from any metal or metalloid of groups 3 to 13 of the Periodic Table.

Also disclosed is composite structure comprising, consisting essentially of or consisting of:
- (i) a substantially spherical soda lime glass core bead with an outer surface and a diameter of from about 500 to about 2000 micrometers; and
- (ii) at least one continuous fused interphase layer covering the outer surface of the core bead,
- wherein the at least one fused interphase layer is formed by:
- (a) coating the outer surface of the core bead with a combination consisting of a plurality of soda lime glass particulates, each particulate having a longest dimension of 10 micrometers or less, and an interfacial modifier having a central atom and two or more organic substituents; and
- (b) heating the resulting coated bead to melt the soda lime glass particulates, followed by cooling to form the at least one fused layer.

Also disclosed is a method of forming a composite structure comprising, consisting essentially of or consisting of (i) a substantially spherical soda lime glass core bead with an outer surface and a diameter of 500 to 2000 micrometers; and (ii) at least one continuous fused interphase layer on the outer surface of the core bead,
- the method comprising:
- (a) coating the outer surface of the core bead with a combination consisting of a plurality of soda lime glass particulates, each particulate having a longest dimension of 10 micrometers or less, and an interfacial modifier having a central atom and two or more organic substituents; and
- (c) heating the resulting coated bead to melt the soda lime glass particulates, followed by cooling to form the at least one fused layer.

In this context the composite must be free of any polymer and organic component. The composite must be free of any component that interferes with forming a continuous layer of glass particulate and interfacial modifier (IM) or prevents fusion.

The term "composite" refers to a combination of core bead, a finely divided glass particulate and a central atom derived from an interfacial modifier in a fused layer surrounding each core.

The term "coating" refers to either (i) a blend of an interfacial modifier (IM), and a finely divided glass particulate (having a particle size less than the central core) or (ii) to the addition of a layer comprising an interfacial modifier, an "IM coating" followed by addition of glass particulates. An "interphase coating" is the unsintered coating of interfacial modifier and glass. An "interphase layer" is the fused layer resulting from sintering/fusing of the mixed interfacial modifier and the glass particulate.

The term "interfacial modifier" (IM) means a compound with an inorganic central atom and two or more organic substituents. Such a metal organo compound can coat the surface of any part of the core, or glass particulate and does not react with the other components of the solid particles or with itself. An IM coated substrate is non-reactive with itself and/or other uncoated substrates. In one embodiment, the IM is an organo-metallic compound. In one embodiment, an organo metallic interfacial modifier comprises a group 13/IIIA or 4/IVB metal or metalloid central atom having organic substituents.

During formation of the fused layer, any organic components of the IM are volatilized. The fused layer therefore contains no or only trace amounts of any organic components of the IM.

The term "core" is an substantially spherical object upon which the interphase layer is formed for the interphase coating. In a spherical particulate circularity=$4\pi(A/P^2)$: wherein A is area and P is perimeter. In a substantially spherical object, the circularity does not deviate more than ±5%.

The term "glass particulate" is a finely divided glass with a particle size substantially less than the core and can be less than 10 microns.

The term "interphase" means a continuous layer formed on the surface of a substrate that can be used in forming a fusion layer. The interphase layer can be then used to bond a functional particle to the surface of the substrate. The composite comprising a substrate and an interphase layer comprising a glass particulate and an interfacial modifier wherein the glass particulate and the interfacial modifier is fused into a fused layer.

The term "function" or "functional" means that the surface obtains one or more catalytic, chemical, or physical properties from the nature and chemical and physical properties of added materials. Functional materials represent a class of advanced materials and composites. These materials possess unique properties or functions. Examples of functional materials include catalytic centers, magnetic, energy storage (battery) materials, energy harvesting or solar cell materials, piezoelectric, multiferroic, filers etc. Functional materials are found in all classes of materials including ceramic, metallic, organic, inorganic, polymeric, etc.

The term "sinter" refers to a process in which sufficient heating causes bonding to form a solid. In a sinter process the glass cores do not melt but may soften and the energy of surface atoms on the core and particulate causes atomic migration or to form bonds that cause a fusion, bonding, or solidification. In the claimed sintering, the temperature is sufficient to fuse the coating, volatilize organic components of the IM but not so high as to liquify or melt the core bead. In the claimed sintering, the central atom or metal component of the interfacial modifier remains in a surface distribution, component or coating derived from the interfacial modifier. After sintering the metal participates in the bonding or fusion.

The term(s) "fusion," "fused," "bond" or "bonded" means that the central core and the interphase layer form a robust mechanically stable structure by sintering a finely divided glass particulate and the interfacial modifier results in the rapid and uniform formation of one or more interphase layers of a fused material surrounding the core bead. The fused nature of the interphase layer in the composite provides a durable robust composite that can survive a harsh use environment. We have seen that the entire outer surface of the core bead, or virtually the entire surface of the core bead, can be covered with the interphase layer. The structure can be assembled and sintered with substantial yield and can be combined into an end use with minimal structural damage to itself and substantial yield of useful end products. The bond is formed by sintering wherein atoms from both the core bead and glass particulate and non-volatile components of the IM combine in a fused layer. The bond is formed at a temperature below the melting point in the core, such as glass. The core may soften without loss of shape but not melt. The core can retain its initial nature except for the bond at the interface. The bond can comprise an alloy structure or a structure formed as atoms from the coating, and core diffuses on into the other into the bond structure therebetween.

DETAILED DESCRIPTION

Figure 1:
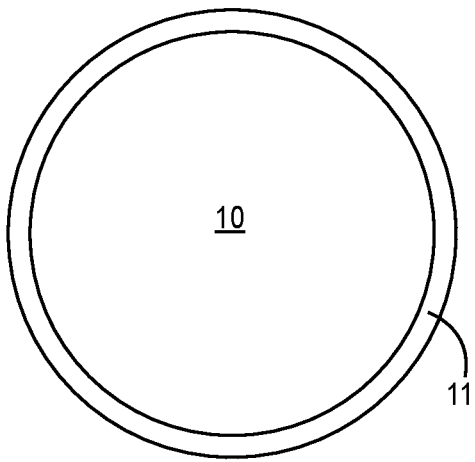
FIGS. 1 and 2 are graphical representations of the single layer and multilayer composite as claimed.

In the claimed composite a first interphase layer is formed comprising glass particulate and interfacial modifier. The glass particulate and interfacial modifier can be added in a blend or separate additions. Once added, the combination of glass particulate and interfacial modifier forms an initial coating. That interphase coating can then be sintered at sintering temperatures to form a fused interphase layer robustly bonded to the underlying substrate. Such structures can be used in further processing to add functionality to the exterior of the interphase layer.

Coating

In the claimed composites, coatings are used to make a composite that can be manufactured in high yields and utility for a variety of use environments. A first coating is formed on the substrate (the core bead) and is sintered to form a fused layer. A second coating can be formed and sintered onto the first fused layer. the combination of layers, during sintering, fuses, and bonds the layers to the substrate. As additional layers are formed upon an initially formed layer, the subsequent layers will have substantially similar dimensions. It is envisioned that greater than two layers of the fused glass can be made simply by repeating the coating and sintering process, resulting in a multilayered structure.

We have beneficially found that a first coating of the interfacial modifier, can be combined with a glass component comprising a finely divided glass powder or particulate (particle size smaller than the core). We have also found that the IM in the coating composition when sintered promotes the fusion or bonding between the glass particulate and the core. The IM promotes close packing of the glass particulate and contributes promoting non-volatile components to the bonding in final fused structure. The glass particulates in the coating composition at sintering temperatures promotes the glass-to-glass bonding of the glass particulate to the cores utilizing at least some amount of the glass particulate and IM to co-operate in the bonding.

In the coating composition used in forming the composite, the ratio of components is typically around 3 to 15 parts by weight of glass particulates per each single part by weight of interfacial modifier. A useful range of this ratio is from 5 to 7 parts by weight of glass particulate for each single part by weight of the interfacial modifier. The coating composition is prepared neat, and the combination must be compatible to form a uniform coating composition for ease of use. In this context, the term "neat" indicates that there is no continuous phase solvent or dispersed dispersion liquid such as a continuous organic solvent or aqueous phase.

The interfacial modifier and glass particulate are blended to form a substantially uniform well dispersed material that can be contacted with substrate such as the larger core to fuse one or more coating layer(s) that is less than about 100μ thickness into a final fuse coating. As currently envisioned, a single layer formed from a mixture of about 5 to 7 parts by weight of glass per one part by weight of interfacial modifier on a core with a diameter of 1 to 1.5 mm will have a thickness in the cooled fused format of approximately 10 to 50 microns, or likely 20 to 30 microns. A second similar coating of 10 to 30 microns can be applied to the fused layer. This assembly composite is sintered into the final product.

Substrate or Core

In an embodiment the core can be any substantially spherical core. Such cores can have a diameter of from about 500 microns about 2 mm, for example about 1000 to about 1500 microns. The cores may have a diameter of from about 500 microns to 1500 microns and can be about 700 to 1700 microns. The surface area of the central core component is covered by the interphase layer in an area of 50 to 100% or 80 to 99% coverage in a fused layer of the coating. These cores are solid and not preferably hollow and can be strong enough to avoid being crushed or broken during further processing, such as by high pressure spraying, kneading, extrusion, or injection molding. In some embodiments these spheres have particle sizes close to the sizes of other particulate if mixed as one material.

In some embodiments, the large central component or the small glass particulate component, can include at least one of silica or alumina. In some embodiments that include silica, the silica can be, for example, fumed silica, precipitated silica, surface modified silica, or nano-silica. In some embodiments the composite can comprise glass cores comprising aluminosilicate, boron trioxide, borophosphosilicate, borosilicate, barium titanate, cobalt, fluorophosphate, fluorosilicate, germanium dioxide, lead glass, opaline glass, soda lime, sodium hexametaphosphate, sodium silicate, tellurite, thoriated glass, uranium glass, or vitrite.

Glass Particulate Coating Component

The fused exterior interphase coating (sintered layer) of is made from IM and a small particle size glass particulate. These particulates are non-spherical. They have an amorphous morphology such that they are plates, jagged solids, irregular, non-regular shapes containing no intentionally spherical material, but containing only shards, chips, and other such odd irregular shapes. There are not hollow particulates but are solid irregularly shaped glass particles.

The maximum particle size for the glass particulate used in this fused layer is about 10 microns, preferably less than or equal to 7 microns, as measured by common instrumental measurement such as A LECOTRAC LTS-150 laser diffraction particle size analyzer. Particulate size can also be easily measured and confirmed by visual inspection by microscopy or by using ASTM B822-20. The maximum size refers to the longest dimension of each particulate.

Commercially available glass particulates are sold with detailed product specifications specifying the particle sizes. The workable range of the glass particulate is generally less than or equal to 7 microns. However, the glass particulate typically is a product comprising a range of glass particles that have a maximum particle size of about seven microns. As the particle size is reduced, the resulting fused layer is well formed but requires as additional interfacial modifier and results in a less efficiently made product.

The glass particulate can be a finely divided glass particle with a $D_{50}$ particle size less than about 10 microns, or example less than about 7 microns. Such particles can be aspherical, or geometrically shaped. The glass particles typically have a particle size of less than about 10 microns so they can be dispersed into the interfacial modifier composition to form a coating composition that can successfully form a coating layer on the larger core particle. Useful glass particulates have a particle size of about 5 to 10 microns and are solid and clear. This product has an average diameter range of 3-10 microns. Non-spherical glass ground and sifted to less than 10 microns have also proven useful and are especially cost effective. The finely divided glass particulate used in the coating comprises a particle size substantially smaller than the core and is a composition that can be dispersed in the final coating composition. The chemistry of the glass particulate and the core can be identical such that the glass particulate and the core are similar in glass composition.

Interfacial Modifier (IM) Component

This disclosure provides a composite that includes a generally large central core component, and an interphase coating formed by heat fusion/bonding of the particulates under the influence of an interfacial modifier. The coating obtains a substantially complete single layer coating of IM and glass particulate. The fused layer includes mass from the core beads, the smaller glass particulates, and any non-organic residue from the IM.

An interfacial modifier can be used to initially form a self-ordered monolayer layer coating of the glass particulate that covers the surface of the core bead. The initial construct can be heated to sinter temperature to fuse the coating into a layer to the core and to volatilize and remove any organic component of the IM. The resulting fused bond includes mass from the glass particulate, the core, and the non-volatile central atom of the IM. The IM both obtains a self-ordered coating and can promote formation of the sintered fusion bonding. The appropriate interfacial modifier for manufacturing article can be measured by monitoring the temperature of the sintering process in which the core and the layer(s) are fused to melt the coating but not the cores.

Interfacial modifiers that may be used in the application fall into broad categories including organic compounds of Group 13/IIIA or Group 4/IVb elements, transition metals or including, for example, titanium compounds, zirconium compounds, hafnium compounds, samarium compounds, neodymium compounds, yttrium compounds, phosphorous compounds, boron compounds, aluminum compounds and zinc compounds. Such compounds can contain from about 1 to about 4 ligands, depending on stoichiometry, comprising hydrocarbyl substituents, hydrocarbyl phosphate esters and/or hydrocarbyl sulfonate esters and about 1 to 4 substantially hydrocarbyl ligands which may further contain unsaturation and heteroatoms such as oxygen, nitrogen, and sulfur In one embodiment, the interfacial modifier that can be used is a type of organo-metallic material such as organo-cobalt, organo-iron, organo-boron, organo-nickel, organo-titanium, organo-aluminum, organo-strontium, organo-neodymium, organo-yttrium, organo-zinc, or organo-zirconium compounds. Suitable organo-titanium, organo-aluminum, organo-boron, organo-strontium, organo-neodymium, organo-yttrium, or organo-zirconium which can be used, and which can be referred to as organo-metallic compounds, are distinguished by the presence of at least one hydrolysable group and at least one organic moiety. Mixtures of the organo-metallic materials may be used. The mixture of the interfacial modifiers or the IM/glass particulate coating may be variously applied, which means at one or more than one composite coating on a surface, or more than one interfacial modifier coating may be applied, to different core or glass particulate with various size distributions (inter).

Certain of these types of compounds may be defined by the following general formula:

$$M(R_1)_n(R_2)_m$$

wherein M is a central atom that can be for example, selected from any of the set of metallic elements occupying Groups 4/IVB-8/VIII, 13/IIIa, in the periodic table. Chemically they show variable valence and a strong tendency to form coordination compounds, and many of their compounds are colored. $R_1$ and $R_2$ are organic groups $R_1$ can be a hydrolysable organic group; $R_2$ is a group consisting of an organic moiety that is non-reactive with polymer or other film former; wherein the sum of m+n must equal the coordination number of the central atom (M) and m and n are integers of 1 to 4 depending on valence and m+n=2-4. Particularly $R_1$ and $R_2$ are an alkoxy or an alkanoate groups having less than 24 carbon atoms. $R_1$ and $R_2$ can be an organic group including between 6-30, preferably 10-24 carbon atoms optionally including one or more hetero atoms selected from the group consisting of N, O, S and P. $R_2$ is a group consisting of an organic moiety, which is not easily hydrolyzed and is often lipophilic and can be a chain of an alkyl, ether, ester, phospho-alkyl, phospho-alkyl, phospho-lipid, or phospho-amine. The phosphorus may be present as phosphate, pyrophosphato, or phosphito groups. Furthermore, $R_1$ and $R_2$ may be linear, branched, cyclic, or aromatic $R_1$ and $R_2$ can be substantially unreactive, i.e., not providing attachment or bonding, to other particles within the composite material.

In an embodiment, we have found that the object is manufactured using a first coating to ensure forming an array between the glass particulate and the core. The resulting product is then further coated with a second, optionally different, coating.

Process

In general, and broadly, the claimed composite structure comprises a substrate or core with a surface covered with a coating formed from interfacial modifier and smaller glass particulates. Once the structure is assembled, it is sintered to ensure that the core and plurality of glass particulate are attached, bonded to, or fused to the substrate core with the coating. In general, the claimed structure is prepared by first forming a coating composition that contains an interfacial modifier and a glass particulate in a single or multi step procedure. That combination, once blended and uniform, is added to the surface of the core and the coating and are agitated until the surface of the core(s) are covered by the combination of interfacial modifier, and small particulate glass. Once a uniform coating on substantially the entire surface of the core(s) is/are obtained, the structure is then sintered at elevated temperature, such that the glass component of the coating promotes formation of a mechanically stable fused coating.

In an embodiment we have found that this method produces a claimed composite that is mechanically robust and can be processed without substantial degradation to the composite or any loss to its functionality as it is either processed or incorporated into final products utilizing the character of the claim structure.

In one embodiment of the claimed composite structures, a 1 to 1.5 mm glass bead it formed with one or more fused glass coatings on the exterior of the bead. These coatings are obtained from mixing glass particles and an interfacial modifier, coating the bead, and melting the glass particulates into an amorphous and continuous fused layer. The glass may be converted from a small, finely divided form into a continuous amorphous glass layer on the exterior of the core bead by fusion at a temperature of from about 650° C. to about 850° C., for example about 700 to about 800° C.

IM Coating Fused Layer

The IM coatings on the fused layer reduces the van der Waals repulsion, decreases free energy of the system and increases the surface tension also causing capillary attraction. The combination of these effects is believed to cause the formation of an continuous layer or particle array due to the coating layer. In the absence of the coating the glass particulate does not readily associate with the other components in the article. The IM coating also maintains the stability of the layer until the composite is sintered to obtain a fused and bonded layer on the core.

Make Composite

The steps in making the composite are:

1) preparation of the core, 2) coating the large central component, and 3) sintering the coated central core, obtaining a substantially complete, single layer, fused and uniform array of the small glass particulate components onto the IM on large core central components.

The core component is well covered with the smaller glass particulate fused layer on the surface of the large core component through the effect of the coating on the surface of the large core component. In an embodiment, the coverage of the array of particulate component over the large central core component of the glass core composite is a single ordered layer, monolayer, of the smaller glass particulate on each of the core. An ordered array of the coating on the surface of the large core can be greater than 50, 60, 70, 80, 90, or 95% of the surface area of the large core.

During the blending phase, the small glass particulate firms a uniform layer on the surface of the core. Surface tension also known as capillary attraction are believed to be forces that causes an uniform array due to the thin interfacial modifier in a continuous layer. In the absence of the IM the glass particulate does not readily associate or cover the central core. After mixing and blending the large and the glass particulate components, the coating is ordered as a monolayer on the surface of the core. The coated core is heated to fuse the composite and layers. The resulting composite can be washed to remove staring materials and dried to obtain a useful composite In this practice of the embodiment, all the processing, including mixing of the various cores and coatings, the time for the interfacial modifier to cover the surfaces of the initial group of cores and for self-ordering of the glass to the surface of the core to form the composite in reasonable period.

Sintering or Heat Bonding

When heated to a sinter temperature, the initial coating on the substrate fuses to form an interphase layer. When heated to a bonding temperature, at the glass particulate/core interphase(s) heat bond by alloying, atomic diffusion or atomic transport events between cores and coating residue occurs during bond formation. The driving force is the combination of atoms at the interphase and a reduction in the system free energy, manifested by decreased surface curvatures, and an elimination of surface area. The bond contains mass derived from the central core, the glass particulate, and any non-organic, non-volatile residue component of the IM.

Temperatures we have used are about 500 to 900° C. Using a heating profile, of 1 minute to less than 60 minutes, that ramps temperature from ambient to a maximum 500 to 900° C. and holding for a period before returning to ambient is helpful in forming the fusion bond and maintaining clarity.

The useful formulation for the composite is shown in the table below. If totals add up to more than 100% because the organic nature of the IM is burned off throughout the sintering steps, is consumed in making the product, but is not present in a significant amount in the final product.

TABLE 1

| | Useful Components | | |
|---|---|---|---|
| Final product | Useful amounts Wt. % | Useful amounts Wt. % | Useful amounts Wt. % |
| Core | 95 to 70 | 95 to 75 | 90 to 70 |
| Glass particulate | 25 to 5 | 20 to 5 | 15 to 5 |
| IM (total from repeated coatings) | 5 to 0.1 | 4 to 0.2 | 3 to 0.3 |

DETAILED DESCRIPTION OF FIGURES

Figure 2:
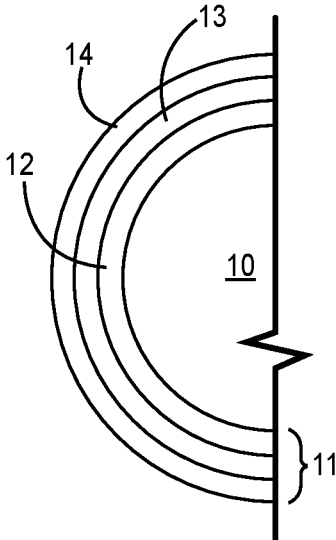

FIGS. 1 and 2 are graphical representations of the single layer and multilayer composite as claimed.

In FIG. 1 there are shown a central core 10 that can be a glass or other inorganic ceramic and a first interphase layer 11 sintered on to the core.

In FIG. 2 there is shown a central core 10 and layered structure 12 a first sintered interphase layer 13, a second interphase layer 14 and a third interphase layer 15.

EXAMPLES AND DATA

The following preparation is set forth to describe a production method for a stable robust composite. Into a 4-liter cylindrical open top heated reaction vessel is placed an amount in grams of a soda lime glass core having a diameter of 1.5 or 2.0 millimeters. The rotary reaction vessel is heated to 75° C. and agitated and into the reactive vessel is placed an amount of an interfacial modifier. The reaction vessel is agitated for approximately 10 minutes to fully coat the glass cores with the interfacial modifier forming a layer that is approximately 10 to 40μ (microns) in thickness. An amount in grams of a glass particulate having a particle size of approximately 3 to 8μ is blended with the coated core. This combination was mixed until uniform and was then placed into the reaction vessel. The interaction between the blend of glass and the interfacial modifier layer causes, during mixing/agitation, the glass being uniformly distributed throughout the interfacial modifier layer and further causing a close packaging of uniform glass layer. During the coating step the vessel is heated to a temperature of about 50° C. The coated glass substrate is removed from the stockpot and is placed in a crucible and is sintered for approximately 20 minutes with a sinter temperature profile begins at about 20° C., rapidly ramps to a temperature that ranges between about 700 and 900° C. After sintering the temperature of the crucible is reduced to ambient room temperature. This coating step is repeated building up the interphase layer to about 10 to 120μ.

TABLE 2

| | Example 1- preparation | | | | |
|---|---|---|---|---|---|
| Glaze 1 | | Glaze 2 | | Glaze 3 | |
| Glass Bead 1.5 mm | 100 pph | Glaze 1 | 100 pph | Glaze 2 | 100 pph |
| IM | 1.05 pph | IM | 1.6 pph | IM | 1.6 pph |
| Glass $D_{50}$ = 7 microns | 10.8 pph | Glass $D_{50}$ = 7 microns | 10.8 | Glass $D_{50}$ = 7 microns | 10.8 pph |
| | Sinter | | Sinter | | Sinter |

TABLE 2-continued

| | Example 1- preparation | | |
|---|---|---|---|
| Glaze 1 | | Glaze 2 | Glaze 3 |
| | 760° C. 20 min | 760° C. 20 min | 760° C. 20 min |
| Perimeter | 2.92 mm | 3.06 mm | 3.15 mm |

Test and Measurement Procedures

The structure of the coating can be seen. When using this technology with glass beads that have a diameter of, for example, 0.5 to 2 mm be easily handled manually, a single coated sphere can be abraded using conventional abrasion techniques to reveal the cross-sectional view of the resulting coated product, and once processed in this abrasive technology, then the individual coatings are readily apparent and can be measured or counted under conventional light microscopy.

In the manufacturing steps regarding this technology, we have found that the resulting structures are stable at less than 800° C. Typically, the heating/fusion/sintering steps are all taken at temperatures less than 800° C., and the final products are quite temperature stable. Such a product is useful in any high temperature processing chemistry involving a mobile fluid, such as gas or liquid, being treated with a catalytic material for the purpose of modifying the nature of the mobile fluid.

For example, catalytic converters for internal combustion engines can be made by forming the exterior layers containing catalytic amounts of noble metals such as platinum or palladium, and several chemical processing catalysts in processing various petrochemical feeds can be envisioned by embedding catalyst materials in or on the surface of the effused layers.

While the claimed structures do not contain any further modifications, the claimed structures can be made by a third party and are ideal for further chemical processing to add processing functionality that is not present in the simple coated structures. However, the coated structures are well suited for further processing into a high temperature functional material and are envisioned as a valuable product with nothing added by us other than the fused layer(s).

The claims may suitably comprise, consist of, or consist essentially of, or be substantially free or free of any of the disclosed or recited elements. The claimed technology is illustratively disclosed herein can also be suitably practiced in the absence of any element which is not specifically disclosed herein. The various embodiments described above are provided by way of illustration only and should not be construed to limit the claims attached hereto. Various modifications and changes may be made without following the example embodiments and applications illustrated and described herein, and without departing from the true spirit and scope of the following claims. Consisting essentially of means that additional component(s), composition(s), or method steps(s) that do not materially change the basic and novel characteristics of the compositions and methods described herein may be included in those compositions or methods and that all the elements recited must be present, and additional elements may be present provided they are only incidental to function or efficacy. Consisting of is a transitional phrase used in a patent claim that excludes any element, step or ingredient not specified in the claim. The claim is subject to avoidance if another element is added.

The specification shows an enabling disclosure of the composite technology, other embodiments may be made with the claimed materials. Accordingly, the invention is embodied solely in the claims hereinafter appended. The specification shows an enabling disclosure of the composite technology, other embodiments may be made with the claimed materials.

We claim:

1. A composite structure comprising:
(i) a substantially spherical soda lime glass core bead with an outer surface and a diameter of from about 500 to about 2000 micrometers; and
(ii) at least one continuous fused interphase layer covering the outer surface of the core bead, wherein the at least one continuous fused interphase layer consists essentially of fused soda lime glass particulates and an inorganic central atom derived from an interfacial modifier and wherein the core bead does not melt.

2. A composite structure comprising:
(i) a substantially spherical soda lime glass core bead with an outer surface and a diameter of from about 500 to about 2000 micrometers; and
(ii) at least one continuous fused interphase layer covering the outer surface of the core bead, wherein the at least one fused interphase layer
consisting essentially of a plurality of soda lime glass particulates, each particulate having a longest dimension of 10 micrometers or less, and an interfacial modifier having a central atom and two or more organic substituents; and heating the resulting coated bead to melt the soda lime glass particulates, followed by cooling to form the at least one fused layer and wherein the core bead does not melt.

3. The composite structure according to claim 2, wherein the central atom of the interfacial modifier is selected from the group consisting of titanium, zirconium, hafnium, samarium, strontium, neodymium, yttrium, boron, cobalt, phosphorous, aluminum and zinc.

4. The composite structure according to claim 2, wherein interfacial modifier has the following structure:

$$M(R1)_n(R2)_m$$

wherein M is a central atom selected from such inorganic central atoms; R1 is a group consisting 5 of a hydrolysable organic group; R2 is a group consisting of an organic moiety, and m and n are integers of 1 to 4 depending on valence and m+n=2-4.

5. The composite structure according to claim 2, wherein the core bead is spherical.

6. The composite structure according to claim 2, wherein the diameter of the core bead is from about 1000 to about 1500 micrometers.

7. The composite structure according to claim 2, comprising one or more additional continuous fused interphase layers consisting of fused soda lime glass particulates and central atoms from an interfacial modifier having a central atom and two or more organic substituents, wherein the one or more additional continuous fused interphase layers are disposed on the at least one fused interphase layer.

8. The composite structure according to claim 2, wherein the at least one fused interphase layer and any additional continuous fused interphase layers each has a thickness of from about 10 to about 50 micrometers.

9. The composite structure according to claim 2, wherein the at least one fused interphase layer and any additional continuous fused interphase layers each has a thickness of from about 20 to about 30 micrometers.

10. A composite structure comprising:
(i) a substantially spherical soda lime glass core bead with an outer surface and a diameter of from about 500 to about 2000 micrometers; and
(ii) at least one continuous fused interphase layer covering the outer surface of the core bead, wherein the at least one continuous fused interphase layer consists of fused soda lime glass particulates and an inorganic central atom derived from an interfacial modifier and wherein the core bead does not melt.

11. A composite structure comprising:
(i) a substantially spherical soda lime glass core bead with an outer surface and a diameter of from about 500 to about 2000 micrometers; and
(ii) at least one continuous fused interphase layer covering the outer surface of the core bead, wherein the at least one fused interphase layer is formed by:
coating the outer surface of the core bead with a mixture consisting of a plurality of soda lime glass particulates, each particulate having a longest dimension of 10 micrometers or 20 less, and an interfacial modifier having a central atom and two or more organic substituents;
and heating the resulting coated bead to melt the soda lime glass particulates, followed by cooling to form the at least one fused layer and wherein the core bead does not melt.

*     *     *     *     *